(12) United States Patent
Pajukoski et al.

(10) Patent No.: US 8,423,037 B2
(45) Date of Patent: Apr. 16, 2013

(54) SINGLE USER MULTIPLE INPUT MULTIPLE OUTPUT USER EQUIPMENT

(75) Inventors: Kari Pajukoski, Oulu (FI); Kari Hooli, Oulu (FI); Esa Tiirola, Kemplele (FI); Tommi Koivisto, Espoo (FI); Timo Roman, Espoo (FI)

(73) Assignee: Nokia Siemens Networks Oy, Espoo (FI)

( * ) Notice: Subject to any disclaimer, the term of this patent is extended or adjusted under 35 U.S.C. 154(b) by 470 days.

(21) Appl. No.: 12/652,937

(22) Filed: Jan. 6, 2010

(65) Prior Publication Data

US 2010/0173640 A1 Jul. 8, 2010

Related U.S. Application Data

(60) Provisional application No. 61/204,443, filed on Jan. 6, 2009.

(51) Int. Cl.
*H04W 72/00* (2009.01)
(52) U.S. Cl.
USPC ............ 455/450; 455/25; 455/63.4; 455/101
(58) Field of Classification Search ................... 455/25, 455/63.4, 101, 450
See application file for complete search history.

(56) References Cited

U.S. PATENT DOCUMENTS

2010/0227569 A1* 9/2010 Bala et al. ..................... 455/73

FOREIGN PATENT DOCUMENTS

| EP | 1 887 713 A2 | 2/2008 |
| WO | WO 2007/109472 A1 | 9/2007 |
| WO | WO 2007/120019 A1 | 10/2007 |
| WO | WO 2007/124566 A1 | 11/2007 |

OTHER PUBLICATIONS

3GPP TS 36.300, V8.6.0 (Sep. 2008), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8).
3GPP TR 36.913, V8.0.0 (Jun. 2008), 3rd Generation Partnership Project; Technical Specification Group Radio Access Network; Requirements for Further Advancements for E-UTRA (LTE-Advanced) (Release 8).
3GPP TS 36.101, V8.3.0 (Sep. 2008), 3rd Generation Partnership Project; Technical Specification Group Radio Access Network; Evolved Universal Terrestrial Radio Access (EUTRA); User equipment (UE) radio transmission and reception (Release 8).
3GPP TS 36.211, V8.4.0 (Sep. 2008), 3rd Generation Partnership Project; Technical Specification Group Radio Access Network; Evolved Universal Terrestrial Radio Access (EUTRA); Physical channels and modulation (Release 8).

* cited by examiner

*Primary Examiner* — Amancio Gonzalez
(74) *Attorney, Agent, or Firm* — Harrington & Smith

(57) ABSTRACT

In accordance with the exemplary embodiments of the invention there is at least a method, apparatus, and a computer program to perform operations including receiving information descriptive of a type of radio access which a user equipment is acting on, and in response to receiving the information descriptive of a particular type of radio access, transmitting from a multiple transmit antenna user equipment so that the transmission appears, at a receiver, to have been made by a single antenna user equipment, or by a user equipment that supports antenna switching/selection.

15 Claims, 5 Drawing Sheets

---

RECEIVING INFORMATION DESCRIPTIVE OF A TYPE OF RADIO ACCESS NETWORK IN WHICH A USER EQUIPMENT IS CURRENTLY ACTIVE — 5A

IN RESPONSE TO RECEIVING INFORMATION DESCRIPTIVE OF A PARTICULAR TYPE OF RADIO ACCESS NETWORK, TRANSMITTING FROM A MULTIPLE TRANSMIT ANTENNA USER EQUIPMENT SO THAT THE TRANSMISSION APPEARS, AT A RECEIVER, TO HAVE BEEN MADE BY A SINGLE ANTENNA USER EQUIPMENT, OR BY A USER EQUIPMENT THAT SUPPORTS ANTENNA SWITCHING/SELECTION — 5B

| | SLOT 0 | | | | SLOT 1 | | | |
|---|---|---|---|---|---|---|---|---|
| | Tx ANT1 | Tx ANT2 | Tx ANT3 | Tx ANT4 | Tx ANT1 | Tx ANT2 | Tx ANT3 | Tx ANT4 |
| OPTION 1 | 1 | 1 | 1 | 1 | 1 | 1 | 1 | 1 |
| OPTION 2 | 1 | -1 | 1 | -1 | 1 | 1 | -1 | -1 |
| OPTION 3, EXAMPLE A | 1 | 1 | -1 | -1 | 1 | -1 | -1 | 1 |
| OPTION 3, EXAMPLE B | 1 | 1 | 1 | 1 | 1 | j | -1 | -j |

SINGLE USER MULTIPLE INPUT MULTIPLE OUTPUT USER EQUIPMENT

CROSS-REFERENCE TO RELATED APPLICATION

This patent application claims priority under 35 U.S.C. §119(e) from Provisional Patent Application No. 61/204,443, filed Jan. 6, 2009, the disclosure of which is incorporated by reference herein in its entirety.

TECHNICAL FIELD

The exemplary and non-limiting embodiments of this invention relate generally to wireless communication systems, methods, devices and computer programs and, more specifically, relate to multiple input/multiple output (MIMO) transmissions from a user equipment having a plurality of transmit antennas.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
DL downlink (eNB towards UE)
eNB EUTRAN Node B (evolved Node B)
EPC evolved packet core
EUTRAN evolved UTRAN (LTE)
CDM code division multiplexing
CQI channel quality indicator
FDD frequency division duplex
FDMA frequency division multiple access
LTE long term evolution
MAC medium access control
MM/MME mobility management/mobility management entity
Node B base station
OFDMA orthogonal frequency division multiple access
O&M operations and maintenance
PDCP packet data convergence protocol
PHY physical layer
PUCCH physical uplink control channel
PUSCH physical uplink shared channel
RLC radio link control
RRC radio resource control
SGW serving gateway
SC-FDMA single carrier, frequency division multiple access
SRS sounding reference signal
SU-MIMO single user multiple input multiple output
TDD time division duplex
TTI transmission timing interval
UE user equipment
UL uplink (UE towards eNB)
UTRAN universal terrestrial radio access network The specification of a communication system known as evolved UTRAN (EUTRAN, also referred to as UTRAN-LTE or as EUTRA) is currently nearing completion within the 3 GPP. As specified the DL access technique is OFDMA, and the UL access technique is SC-FDMA.

One specification of interest is 3GPP TS 36.300, V8.6.0 (2008-09), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety.

FIG. 1 reproduces Figure 4.1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configurations for providing mobility and scheduling.

The system described above may be referred to for convenience as LTE Rel-8, or simply as Rel-8. In general, the set of specifications given generally as 3GPP TS 36.xyz (e.g., 36.101, 36.211, 36.311, 36.312, etc.) may be seen as describing the entire Rel-8 LTE system.

Of particular interest herein are the further releases of 3GPP LTE targeted towards future IMT-A systems, referred to herein for convenience simply as LTE-Advanced (LTE-A). Reference can also be made to 3GPP TR 36.913, V8.0.0 (2008-06), 3rd Generation Partnership Project; Technical Specification Group Radio Access Network; Requirements for Further Advancements for E-UTRA (LTE-Advanced) (Release 8), which is incorporated by reference herein in its entirety.

LTE-A will be a radio system fulfilling the ITU-R requirements for IMT-Advanced while maintaining backwards compatibility with LTE Rel-8. It is assumed at present that single user (SU) MIMO UEs having, for example, two, three or four transmission antennas will be part of LTE-A.

Due to the required backwards compatibility, an LTE-A UE must operate in an LTE Rel-8 cell or network. However, LTE Rel-8 supports mainly single antenna UL transmissions, with an option for transmit antenna selection. Thus, one important item related to the specification and design of a LTE-A SU-MIMO UE is the transmission capability of the UE in a LTE Release 8 cell.

SUMMARY

In an exemplary aspect of the invention, there is a method comprising receiving information descriptive of a type of radio access which a user equipment is acting on, and in response to receiving the information descriptive of a particular type of radio access, transmitting from a multiple transmit antenna user equipment so that the transmission appears, at a receiver, to have been made by a single antenna user equipment, or by a user equipment that supports antenna switching/selection.

In another exemplary aspect of the invention, there is an apparatus comprising at least one processor, and at least one memory including computer program code, where the at least one memory and the computer program code are configured, with the at least one processor, to cause the apparatus to at least receive information descriptive of a type of radio access which a user equipment is acting on, and in response to receiving the information descriptive of a particular type of radio access, transmit from a multiple transmit antenna user equipment so that the transmission appears, at a receiver, to have been made by a single antenna user equipment, or by a user equipment that supports antenna switching/selection.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In addition to the two 3GPP specifications noted in the background section, reference may also be made to 3GPP TS 36.101, V8.3.0 (2008-09), 3rd Generation Partnership Project; Technical Specification Group Radio Access Network; Evolved Universal Terrestrial Radio Access (EUTRA); User equipment (UE) radio transmission and reception (Release 8), "Transmitter characteristics", describes the UE Rel-8 transmitter operation, which is incorporated by reference herein in its entirety.

Reference may also be made to 3GPP TS 36.211, V8.4.0 (2008-09), 3rd Generation Partnership Project; Technical Specification Group Radio Access Network; Evolved Universal Terrestrial Radio Access (EUTRA); Physical channels and modulation (Release 8). This document describes various UL channels, including the PUSCH and PUCCH discussed below, as well as the SRS and precoding. PUSCH frequency hopping is described in sub clause 5.3.4, "Mapping to physical resources".

The exemplary embodiments of this invention provide a multi-antenna transmission arrangement for an LTE-A SU-MIMO UE in a Rel-8 cell. While the ensuing description is focused on the FDD mode, the exemplary embodiments pertain as well to the TDD mode.

For an LTE-A UE with multiple transmission antennas to operate in the LTE Rel-8 cell, an UL transmission from multiple antennas that is transparent to the base station (eNB) is needed. Several considerations need to be taken into account in this type of transmission arrangement:

(i) the transmission arrangement should support existing Rel-8 channels and formats;

(ii) the transmission should appear to the eNB as a single antenna transmission or, alternatively on the PUSCH and SRS, as an eNB directed antenna selection transmission with two transmit antennas; and (iii) the transmission arrangement should not change considerably the statistical properties of the received signal so that undesirable impacts on eNB estimators and algorithms can be avoided (e.g., the impact on algorithms such as channel estimation, UE velocity estimation and frequency domain scheduling based on SRS feedback should be minimized).

Further considerations may include the desirability that power amplifiers (PAs) in a SU-MIMO UE be dimensioned according to the multi-antenna transmission, thereby resulting in smaller PAs. For example, 21 dBm PAs may be used in a 2-antenna UE, as opposed to a 24 dBm PA in a single antenna UE. Hence, the transmission arrangement may preferably optimize the use of all transmission power resources available at the UE (in order to maintain the UL coverage of the Rel-8 network with the SU-MIMO UE).

Furthermore, the transmission arrangement should mitigate the impact of a possible negative correlation between transmit antennas.

Figure 1:
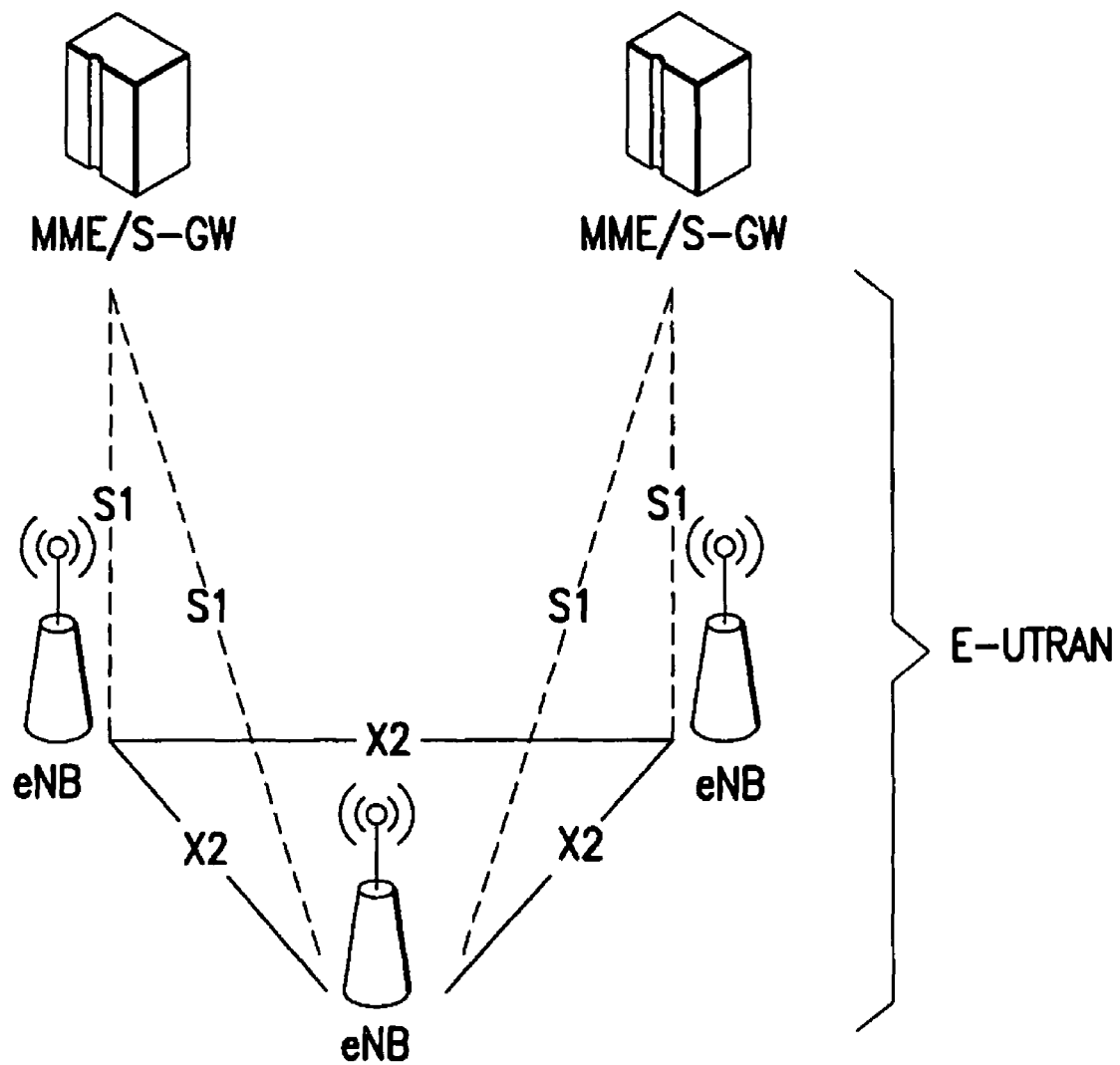
FIG. 1 reproduces FIG. 4 of 3GPP TS 36.300, and shows the overall architecture of the EUTRAN system.
Figure 2A:
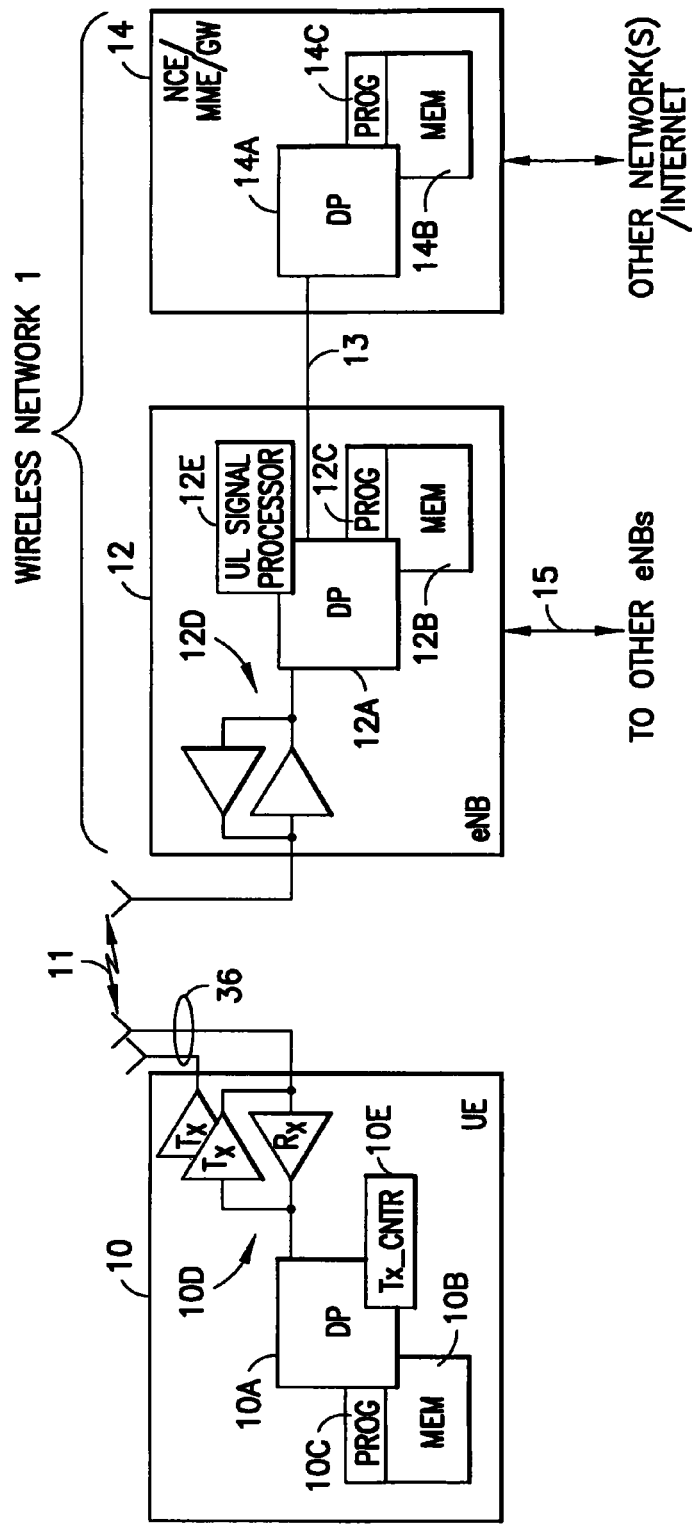
FIG. 2A shows a simplified block diagram of various electronic devices that are suitable for use in practicing the exemplary embodiments of this invention.

Before describing in further detail the exemplary embodiments of this invention, reference is made to FIG. 2A for illustrating a simplified block diagram of various electronic devices and apparatus that are suitable for use in practicing the exemplary embodiments of this invention. In FIG. 2A a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1, and which provides connectivity with a further network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via a plurality of antennas 36. For the purposes of describing this invention it may be assumed that the UE 10 includes at least two transmit antennas 36, and a corresponding number of transmitter (Tx) power amplifiers. Note that in a typical configuration there are also at least two receive (Rx) antennas at the eNB 12 side, and typically also two Rx chains at the UE 10 side (for LTE).

Figures 3, 4:
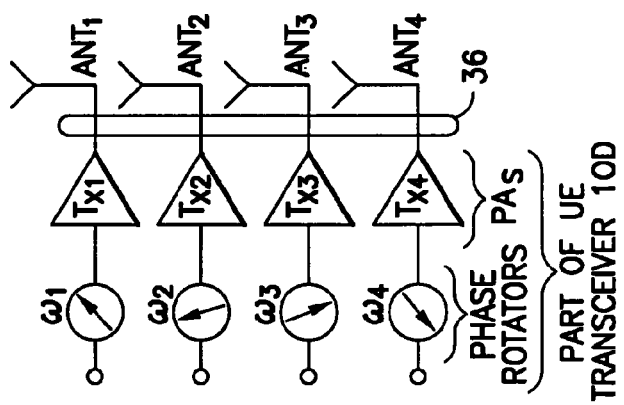
FIG. 3 shows a table of exemplary antenna weights for PUCCH transmission with four UE transmit antennas.
FIG. 4 shows in greater detail a portion of the UE transceiver shown in FIG. 2A.

FIG. 4 shows in greater detail a portion of the UE transceiver 10A shown in FIG. 2A. In this exemplary embodiment there are four transmit antennas 36, each having an associated Tx power amplifier (PA). Also shown are a corresponding number of phase rotators, discussed in further detail below.

The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1. The eNB 12 may also be coupled to another eNB via data/control path 15, which may be implemented as the X2 interface shown in FIG. 1.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a Tx control function (Tx_CNTR) 10E. The eNB 12 may be assumed to include an UL signal processor 12E that operates on signals received from the UE 10.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 2B:
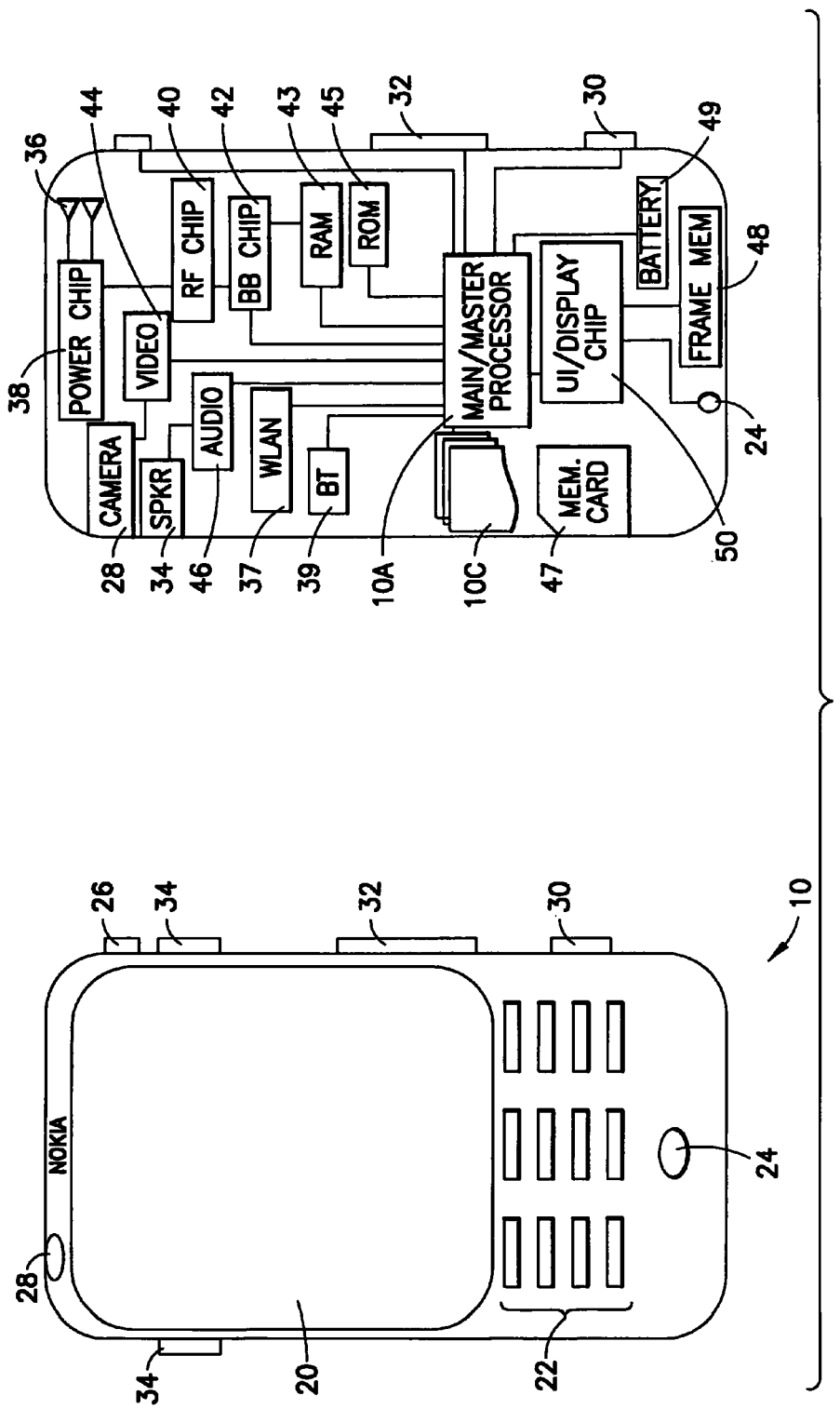
FIG. 2B shows a more particularized block diagram of a user equipment such as that shown at FIG. 2A.

FIG. 2B illustrates further detail of an exemplary UE 10 in both plan view (left) and sectional view (right), and the invention may be embodied in one or some combination of those more function specific components. At FIG. 2B the UE 10 has a graphical display interface 20 and a user interface 22 illustrated as a keypad but understood as also encompassing touch screen technology at the graphical display interface 20 and voice recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 2B are seen the multiple transmit antennas, and possibly also multiple receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio frequency (RF) chip 40 which demodulates and down converts the signal for baseband processing. The baseband (BB) chip 42 detects the signal which is then converted to a bit stream and finally decoded. Similar processing occurs in reverse for signals generated in the apparatus 10 and transmitted from it.

Those signals that go to and from the camera 28 pass through an image/video processor 44 that encodes and decodes the image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on the chip or be coupled to an antenna off the chip. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The processors 38, 40, 42, 44, 46, 50, if embodied as separate entities in a UE 10 or eNB 12, may operate in a slave relationship to the main processor 10A, 12A, which may then be in a master relationship to them. Embodiments of this invention may be disposed across various chips and memories as shown, or disposed within another processor that combines some of the functions described above for FIG. 2B. Any or all of these various processors of FIG. 2B access one or more of the various memories, which may be on chip with the processor or separate from the processor. Similar function-specific components that are directed toward communications over a network broader than a piconet (e.g., components 36, 38, 40, 42-45 and 47) may also be disposed in exemplary embodiments of the access node 12, which may have an array of tower mounted antennas rather than the two shown at FIG. 2B.

Note that the various integrated circuits (e.g., chips 38, 40, 42, etc.) that were described above may be combined into a fewer number than described and, in a most compact case, may all be embodied physically within a single chip.

The exemplary embodiments of this invention provide a transmission arrangement for the LTE-A SU-MIMO UE 10 that optimizes UL performance in LTE Rel-8, and potentially in LTE Release 9 (and beyond) cells/networks as well.

The SU-MIMO UE 10, which has the multiple transmit antennas 36 and power amplifiers, changes the UL multi-antenna transmission based on received information that is descriptive of the cell/network type (e.g., Rel-8/Rel-9/Rel-10).

When the LTE-A SU-MIMO UE 10 is connected to the Rel-8 eNB 12, the UL signal is generated according to the Rel-8 specifications and it is transmitted from one or multiple UE antennas 36. The transmission arrangement provides the eNB 12 with multiple signal combinations from different UE transmit antennas 36, while the signal properties that appear to the Rel-8 eNB are maintained to appear appropriate both in the time and the frequency domains. The change of transmit antenna combinations use discontinuous frequency allocation in the case of PUCCH and frequency hopping PUSCH, a Rel-8 option for UE transmit antenna selection and a gradual change in the frequency domain.

The multi-antenna transmissions appear to the Rel-8 eNB 12 as Rel-8 transmissions from a single antenna UE or, alternatively, from a UE that supports 2-antenna switching. Transmission arrangements involve antenna switching as well as antenna virtualization based on antenna grouping, precoding and/or cyclic delay.

Discussed first is UE 10 transmission on the PUCCH or on the frequency hopping PUSCH. In these cases the UE 10 transmits on resource block sets that are separate in frequency. Thus, there can be discontinuity in the frequency domain response appearing to the Rel-8 eNB 12. The transmission arrangements in accordance with the exemplary embodiments of this invention utilize this possibility to employ different antenna configurations in different parts of the LTE Rel-8 bandwidth.

The following options are made available for use by the UE 10.

Option 1: In this first option the UE 10 selects and uses one of the transmit antennas 36 available at the UE. Different ones of the antennas 36 are used in consecutive slots or sub-frames that are transmitted at different frequencies (that is, within the frequency hopping period). For example, slot 0 is transmitted from antenna$_1$ and slot 1 is transmitted from antenna$_2$ on the PUCCH. One exemplary advantage of this approach is simplicity, while fulfilling most of the considerations discussed above.

Option 2: In this second option the UE 10 virtualizes multiple transmit antennas by grouping them into antenna groups, and transmits the same signal from all antennas in an antenna group. Different antenna groups are used in consecutive slots or sub-frames that are transmitted at different frequencies (that is, within the frequency hopping pattern). As a non-limiting example, for a PUCCH transmission antenna group 1 can contain antennas 1 and 3 and antenna group 2 can contain antennas 2 and 4. Then slot 0 may be transmitted from antenna group 1 and slot 1 may be transmitted from antenna group 2. Changing the antenna grouping as described serves to mitigate the impact of a possible negative correlation of the radio channel between the antenna groups. One exemplary advantage of this approach is simplicity, while fulfilling the considerations discussed above. Note that this second option reduces to the first option in the case of two UE 10 transmit antennas 36.

Option 3: In this third option the UE 10 virtualizes multiple transmit antennas by the use of precoding vectors, and switches between the precoding vectors. It should be noted that it may be preferred to use precoding vectors having a constant modulus, although the use of precoding vectors with constant modulus is not a requirement to implement the exemplary embodiments of this invention. In general, a first precoding vector may be associated with a first set of precoding weights, and a second precoding vector may be associated with a second set of precoding weights. In order to mitigate possible negative correlation, different precoding vectors are used in consecutive slots or sub-frames that are transmitted at different frequencies (that is, within the frequency hopping pattern). For example (example a in FIG. 3), for a PUCCH transmission slot 0 can be transmitted with precoding vector [1 −1 1 −1] and slot 1 can be transmitted with precoding vector [1 1 −1 −1] (this example may also be viewed as precoding with [1 −1] over antenna groups that are rearranged at the slot boundary). In the case of two transmit antennas (example b) the precoding vectors may be, as one example, [1 1] and [1 −1]. In the case of TDD, the precoding vectors may be derived from DL channel estimates utilizing DL/UL reciprocity. One exemplary advantage of this approach is simplicity, while fulfilling all of the considerations discussed above.

The foregoing options are tabulated in FIG. 3, which shows antenna selections for the case of PUCCH transmission with a UE 10 having four transmit antennas 36, and which has a frequency hopping pattern of two (slot 0, slot1).

Discussed now is the PUSCH transmission without frequency hopping. In these cases the UE 10 may be allocated wideband PUSCH transmissions and/or a SRS providing channel state information on a wide PUSCH bandwidth. However, a discontinuity in the frequency domain response appearing to the Rel-8 eNB 12 may result in, for example, degradation of the channel estimation and thus is not preferable.

Two main cases are considered below: the LTE-A UE 10 appears as a Rel-8 UE supporting transmit antenna selection, or the LTE-A UE 10 appears as a single antenna Rel-8 UE (which is also the case if the Rel-8 eNB does not support UE antenna selection).

Discussed first is the case where the LTE-A UE 10 appears as a Rel-8 UE supporting transmit antenna selection.

In accordance with the exemplary embodiments of this invention at least two transmission arrangements (options) may be provided.

The following options are made available for use by the UE 10.

Option 1: In the first option the UE 10 selects two of the transmit antennas 36 to be used, with the antenna selection directed by the eNB 12. In the case that more than two transmit antennas are available at the UE 10, the UE may alternatively virtualize antennas by grouping transmit antennas 36 into two antenna groups, and using them as the transmit antennas appearing to the eNB 12. Antenna selection can also be seen as a form of precoding with [1 0] and [0 1] as precoding vectors in the two transmit antenna case. One exemplary advantage of this approach is simplicity, while fulfilling most of the considerations discussed above.

Option 2: In this second option the UE 10 selects two of the precoding vectors for multiple transmit antennas 12 and uses them as the transmit antennas appearing to the eNB 12. For example, precoding vectors of [1 1] and [1 −1] can be used with two transmit antennas 36, while precoding vectors of [1 1 1 1] and [1 −1 1 −1] may be used with four transmit antennas. One exemplary advantage of this approach is simplicity, while fulfilling all of the considerations discussed above.

As was noted above, it may be preferred to use precoding vectors having a constant modulus, although the use of precoding vectors with constant modulus is not a requirement to implement the exemplary embodiments of this invention.

Discussed now is the case where the LTE-A UE 10 appears as a single antenna Rel-8 UE.

In accordance with the exemplary embodiments of this invention at least three transmission arrangements (options) may be provided.

The following options are made available for use by the UE 10.

Option 1: In the first option the UE 10 selects and uses one of the transmit antennas 36. One exemplary advantage of this approach is simplicity, while fulfilling most of the considerations discussed above.

Option 2: In the second option, and in the case of TDD, the UE 10 derives a precoding vector from the DL channel estimates utilizing DL/UL reciprocity and uses the precoding vector for the UL transmission. One exemplary advantage of this approach is simplicity, while fulfilling all of the considerations discussed above.

Option 3: In the third option signals from different transmit antennas 36 are cyclically delayed relative to the first transmit antenna by an antenna specific delay. The delay is selected so that: (a) the delay does not reduce the coherence bandwidth of the resulting signal (when the signals from the transmitting antennas 36 are combined) below a typically expected channel coherence bandwidth in the case of single transmit antenna; and (b) the delay spread of the signal arriving at the eNB 12 is increased by only an acceptable amount when compared to cyclic prefix length. The delay may be predetermined. An exemplary value is 0.5 us.

As opposed to the use of cyclic delay diversity (CDD), the purpose of this third option is not to introduce delay that is sufficient to provide antenna diversity within the expected scheduling bandwidth. Instead, a purpose is to alleviate the impact of antenna correlation by gradually changing the signal phase (in frequency) between transmit antennas 36. The gradual change of the signal phase (in frequency) can be performed over the entire bandwidth available at the eNB 12 for PUSCH. Thus, the signal phase difference between transmit antennas (in frequency) can depend on the location in the frequency of the physical resource scheduled for the UE 10. In this case it is the channel sounding and frequency domain scheduling of eNB 12 that is relied on to schedule the UE 12 on a frequency where signals from the transmit antennas 36 combine constructively. One exemplary advantage of this approach is simplicity, while fulfilling all of the considerations discussed above.

In all cases, the SRS is transmitted with the same transmission arrangement that is selected for PUSCH.

Additionally, the signals to different transmit antennas 36 can be rotated with an antenna specific phase rotator. Reference in this regard can be made to FIG. 4. The phase rotator may be changed between TTIs. The change rate and sign of the rotator is transmit-antenna specific, and the maximum change rate is selected to be sufficiently low so that the coherence time/time correlation of the resulting signal (when the signals from the transmitting antennas 36 are combined at the eNB 12) corresponds to a coherence time/time correlation of a signal received from a low velocity terminal (e.g., one having a velocity of 10 km/h). For example, phase rotators $w_1, w_2, \ldots, w_N$ for N transmit antennas can be defined with $w_n = \exp(j\alpha/N(-1)^n\lfloor n/2 \rfloor)$ where a is selected to provide the desired coherence time.

In the TDD case, and utilizing channel reciprocity, the precoding vector update rate is preferably selected to be relatively low.

Based on the foregoing it should be apparent that the exemplary embodiments of this invention provide a method, apparatus and computer program(s) to provide a transmission from a multiple transmit antenna user equipment with an appearance, at a receiver, of a transmission made by a single antenna user equipment, or a transmission made by a user equipment that supports antenna switching/selection.

Figure 5:
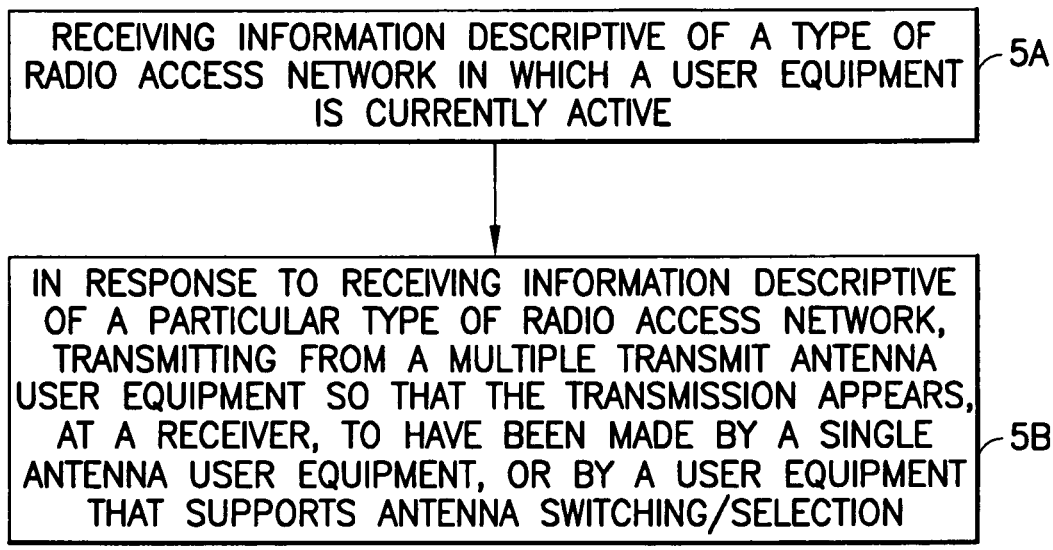
FIG. 5 is a logic flow diagram that illustrates the operation of a method, and a result of execution of computer program instructions embodied on a computer readable memory, in accordance with the exemplary embodiments of this invention.

(A) FIG. 5 is a logic flow diagram that illustrates the operation of a method, and a result of execution of computer program instructions, in accordance with the exemplary embodiments of this invention. In accordance with these exemplary embodiments a method performs, at Block 5A, receiving information descriptive of a type of radio access network in which a user equipment is currently active and, at Block 5B, in response to receiving information descriptive of a particular type of radio access network, there is a step of transmitting from a multiple transmit antenna user equipment so that the transmission appears, at a receiver, to have been made by a single antenna user equipment, or by a user equipment that supports antenna switching/selection.

(B) In the method, and as a result of the execution of computer program instructions as in the preceding paragraph, where the particular type of radio access network is a Rel-8 LTE radio access network, where the transmission is made on a physical uplink control channel, or on a frequency hopping physical uplink shared channel, and where the step of transmitting further comprises selecting one of the multiple transmit antennas to transmit during a first slot at a first frequency, and another one of the multiple transmit antennas to transmit during a second slot at a second frequency.

(C) In the method, and as a result of the execution of computer program instructions as in the preceding paragraph (A), where the particular type of radio access network is a Rel-8 LTE radio access network, where the transmission is made on a physical uplink control channel, or on a frequency hopping physical uplink shared channel, and where the step of transmitting further comprises partitioning the multiple transmit antennas into at least two groups of transmit antennas, each group having at least two transmit antennas, and selecting one of the groups of transmit antennas to transmit during a first slot at a first frequency, and another one of the groups of transmit antennas to transmit during a second slot at a second frequency.

(D) In the method, and as a result of the execution of computer program instructions as in the preceding paragraph (A), where the particular type of radio access network is a Rel-8 LTE radio access network, where the transmission is made on a physical uplink control channel, or on a frequency hopping physical uplink shared channel, and where the step of transmitting further comprises selecting a first precoding vector for the multiple transmit antennas for transmitting during a first slot at a first frequency, and selecting a second precoding vector for the multiple transmit antennas for transmitting during a second slot at a second frequency.

(E) In the method, and as a result of the execution of computer program instructions as in the preceding paragraph (A), where the particular type of radio access network is a Rel-8 LTE radio access network, where the transmission is made on a physical uplink shared channel, and where the step of transmitting further comprises selecting at least two transmit antennas or at least two groups of transmit antennas and using the selected antennas or antenna groups in accordance with instructions received from a base station such that the user equipment appears to the base station as supporting transmit antenna selection.

(F) In the method, and as a result of the execution of computer program instructions as in the preceding paragraph (A), where the particular type of radio access network is a Rel-8 LTE radio access network, where the transmission is made on a physical uplink shared channel, and where the step of transmitting further comprises selecting a first precoding vector for the multiple transmit antennas and selecting a second precoding vector for the multiple transmit antennas and using the selected first and second precoding vectors in accordance with instructions received from a base station such that the user equipment appears to the base station as supporting transmit antenna selection.

(G) In the method, and as a result of the execution of computer program instructions as in the preceding paragraph (A), where the particular type of radio access network is a Rel-8 LTE radio access network, where the transmission is made on a physical uplink shared channel, and where the step of transmitting further comprises selecting a single one of the multiple transmit antennas for transmitting to a base station such that the user equipment appears to the base station as having a single transmit antenna.

(H) In the method, and as a result of the execution of computer program instructions as in the preceding paragraph (A), where the particular type of radio access network is a Rel-8 LTE radio access network, where the transmission is made on a physical uplink shared channel, and where the step of transmitting further comprises, a time division duplex case, deriving a precoding vector from a downlink channel estimate, and using the derived channel vector for transmitting on a single one of the multiple transmit antennas to a base station such that the user equipment appears to the base station as having a single transmit antenna.

(I) In the method, and as a result of the execution of computer program instructions as in the preceding paragraph (A), where the particular type of radio access network is a Rel-8 LTE radio access network, where the transmission is made on a physical uplink shared channel, and where the step of transmitting further comprises cyclically delaying signals from different ones of the multiple transmit antennas, relative to a first transmit antenna, by an antenna specific delay such that the user equipment appears to the base station as having a single transmit antenna.

(J) In the method, and as a result of the execution of computer program instructions as in the preceding paragraph (I), where the antenna specific delay determined such that the delay does not reduce coherence bandwidth of the resulting signal, when the signals from the multiple transmit antennas are combined, below a typical channel coherence bandwidth, and such that a delay spread of the transmitted signal is increased by an acceptable amount when compared to a cyclic prefix length.

(K) In the method, and as a result of the execution of computer program instructions as in the preceding paragraphs, further comprising rotating signals to individual ones of the multiple transmit antennas with an antenna-specific phase rotation, where a change in the rotation rate and sign is selected such that a coherence time/time correlation of the resulting signal, when the signals from the multiple transmit antennas are combined, corresponds to a coherence time/time correlation that would be received from a user terminal moving at a low velocity.

The various blocks shown in FIG. 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system and the LTE-A system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, any names used for any described parameters are not intended to be limiting in any respect, as these parameters may be identified by any suitable names. Further, the formulas and expressions that use these various parameters may differ from those expressly disclosed herein. Further, the various names assigned to different channels (e.g., PUCCH, PUSCH, SRS, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
  receiving information descriptive of a type of radio access which a user equipment is acting on; and
  in response to receiving the information descriptive of a particular type of radio access, transmitting from a multiple transmit antenna user equipment, where the particular type of radio access is a Rel-8/9 LTE type radio access, where the transmission is made on a physical uplink shared channel, where the transmitting further comprises cyclically delaying signals from different ones of the multiple transmit antennas, relative to a first transmit antenna, by an antenna specific delay such that the user equipment appears to a base station as having a single transmit antenna, and where the antenna specific delay determined such that the delay does not reduce coherence bandwidth of the resulting signal, when the signals from the multiple transmit antennas are combined, below a typical channel coherence bandwidth, and such that a delay spread of the transmitted signal is increased by an acceptable amount when compared to a cyclic prefix length.

2. The method according to claim 1, where the transmitting further comprises selecting one of the multiple transmit antennas to transmit during a first slot at a first frequency, and another one of the multiple transmit antennas to transmit during a second slot at a second frequency.

3. The method according to claim 1, where the transmitting further comprises partitioning the multiple transmit antennas into at least two groups of transmit antennas, each group having at least two transmit antennas, and selecting one of the groups of transmit antennas to transmit during a first slot at a first frequency, and another one of the groups of transmit antennas to transmit during a second slot at a second frequency.

4. The method according to claim 1, where the transmitting further comprises selecting a first precoding vector for the multiple transmit antennas for transmitting during a first slot at a first frequency, and selecting a second precoding vector for the multiple transmit antennas for transmitting during a second slot at a second frequency.

5. The method according to claim 1, where the transmitting further comprises selecting at least two transmit antennas or at least two groups of transmit antennas and using the selected antennas or antenna groups in accordance with instructions received from the base station such that the user equipment appears to the base station as supporting transmit antenna selection.

6. The method according to claim 1, where the transmitting further comprises selecting a first precoding vector for the multiple transmit antennas and selecting a second precoding vector for the multiple transmit antennas and using the selected first and second precoding vectors in accordance with instructions received from the base station such that the user equipment appears to the base station as supporting transmit antenna selection.

7. The method according to claim 1 performed by software embodied on a memory and executed by at least one data processor.

8. An apparatus comprising:
at least one processor; and
at least one memory including computer program code, where the at least one memory and the computer program code are configured, with the at least one processor, to cause the apparatus to at least:
receive information descriptive of a type of radio access which a user equipment is acting on; and
in response to receiving the information descriptive of a particular type of radio access, transmit from a multiple transmit antenna user equipment, where the particular type of radio access is a Rel-8/9 LTE type radio access, where the transmission is made on a physical uplink shared channel, and where the transmitting comprises cyclically delaying signals from different ones of the multiple transmit antennas, relative to a first transmit antenna, by an antenna specific delay such that the user equipment appears to a base station as having a single transmit antenna, and where the antenna specific delay determined such that the delay does not reduce coherence bandwidth of a resulting signal, when the signals from the multiple transmit antennas are combined, below a typical channel coherence bandwidth, and such that a delay spread of the transmitted signal is increased by an acceptable amount when compared to a cyclic prefix length.

9. The apparatus according to claim 8, where the transmitting further comprises selecting one of the multiple transmit antennas to transmit during a first slot at a first frequency, and another one of the multiple transmit antennas to transmit during a second slot at a second frequency.

10. The apparatus according to claim 8, where the transmitting further comprises partitioning the multiple transmit antennas into at least two groups of transmit antennas, each group having at least two transmit antennas, and selecting one of the groups of transmit antennas to transmit during a first slot at a first frequency, and another one of the groups of transmit antennas to transmit during a second slot at a second frequency.

11. The apparatus according to claim 8, where the transmitting further comprises selecting a first precoding vector for the multiple transmit antennas for transmitting during a first slot at a first frequency, and selecting a second precoding vector for the multiple transmit antennas for transmitting during a second slot at a second frequency.

12. The apparatus according to claim 8, where the transmitting further comprises selecting at least two transmit antennas or at least two groups of transmit antennas and using the selected antennas or antenna groups in accordance with instructions received from the base station such that the user equipment appears to the base station as supporting transmit antenna selection.

13. The apparatus according to claim 8, where the transmitting further comprises selecting a first precoding vector for the multiple transmit antennas and selecting a second precoding vector for the multiple transmit antennas and using the selected first and second precoding vectors in accordance with instructions received from the base station such that the user equipment appears to the base station as supporting transmit antenna selection.

14. A method comprising:
receiving information descriptive of a type of radio access which a user equipment is acting on;
in response to receiving the information descriptive of a particular type of radio access, transmitting from a multiple transmit antenna user equipment so that the transmission appears, at a receiver, to have been made by a single antenna user equipment, or by a user equipment that supports antenna switching/selection; and
rotating signals to individual ones of the multiple transmit antennas with an antenna-specific phase rotation, where a change in the rotation rate and sign is selected such that a coherence time/time correlation of the resulting signal, when the signals from the multiple transmit antennas are combined, corresponds to a coherence time/time correlation that would be received from a user terminal moving at a low velocity.

15. An apparatus comprising:
at least one processor; and
at least one memory including computer program code, where the at least one memory and the computer program code are configured, with the at least one processor, to cause the apparatus to at least:
receive information descriptive of a type of radio access which a user equipment is acting on;
in response to receiving the information descriptive of a particular type of radio access, transmit from a multiple transmit antenna user equipment so that the transmission appears, at a receiver, to have been made by a single antenna user equipment, or by a user equipment that supports antenna switching/selection; and rotating signals to individual ones of the multiple transmit antennas with an antenna-specific phase rotation, where a change in the rotation rate and sign is selected such that a coherence time/time correlation of the resulting signal, when the signals from the multiple transmit antennas are combined, corresponds to a coherence time/time correlation that would be received from a user terminal moving at a low velocity.

* * * * *